(12) United States Patent
Wildhagen

(10) Patent No.: US 7,149,312 B1
(45) Date of Patent: Dec. 12, 2006

(54) METHOD AND DEVICE TO RETRIEVE RDS INFORMATION

(75) Inventor: Jens Wildhagen, Weinstadt (DE)

(73) Assignee: Sony Deutschland GmbH, Cologne (DE)

( * ) Notice: Subject to any disclaimer, the term of this patent is extended or adjusted under 35 U.S.C. 154(b) by 465 days.

(21) Appl. No.: 09/691,337

(22) Filed: Oct. 18, 2000

(30) Foreign Application Priority Data

Oct. 20, 1999 (EP) .................................. 99120799

(51) Int. Cl.
*H04H 5/00* (2006.01)

(52) U.S. Cl. .................... 381/2; 381/16; 381/6; 381/14

(58) Field of Classification Search .................... 381/1, 381/2, 3, 6, 7, 14, 15, 17, 4, 16; 455/260
See application file for complete search history.

(56) References Cited

U.S. PATENT DOCUMENTS

| 3,787,629 | A | * | 1/1974 | Limberg | 381/5 |
|---|---|---|---|---|---|
| 4,384,357 | A | * | 5/1983 | deBuda et al. | 375/327 |
| 4,827,515 | A | | 5/1989 | Reich | |
| 5,257,312 | A | * | 10/1993 | Therssen | 371/7 |
| 5,428,827 | A | * | 6/1995 | Kasser | 455/161.3 |
| 5,507,024 | A | * | 4/1996 | Richards, Jr. | 455/260 |
| 5,673,324 | A | * | 9/1997 | Kasser | 381/4 |
| 6,351,631 | B1 | * | 2/2002 | Noeske et al. | 455/260 |
| 6,694,026 | B1 | * | 2/2004 | Green | 381/3 |

* cited by examiner

*Primary Examiner*—Xu Mei
(74) *Attorney, Agent, or Firm*—Oblon, Spivak, McClelland, Maier & Neustadt, P.C.

(57) ABSTRACT

To retrieve RDS information by filtering and transforming an incoming multiplex signal (m(t)) into a RDS baseband signal, an amplitude modulated RDS signal ($m_a(t)$, $m_c(t)$) is derived on basis of an intermediate signal ($m_a(t)$) obtained during an extraction of a stereo-difference signal ($m_d(t)$) from the incoming multiplex signal (m(t)).

27 Claims, 8 Drawing Sheets

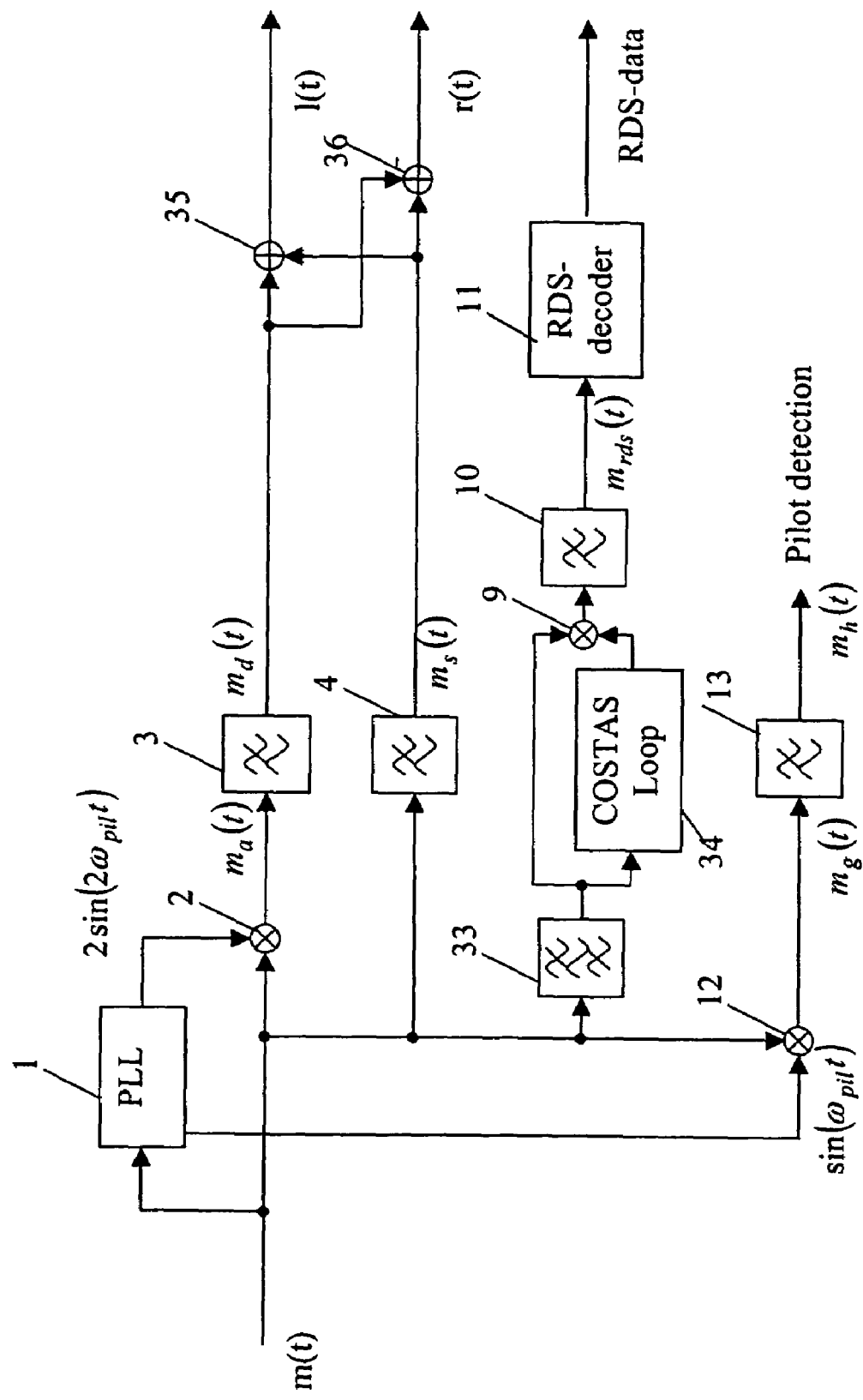

METHOD AND DEVICE TO RETRIEVE RDS INFORMATION

The present invention relates to the demodulation of radio data system (RDS) signals, in particular to a method to retrieve RDS information according to the pre-characterizing portion of claim 1 and to a RDS demodulator operating according to such a method.

In fm-broadcasting a stereo-multiplex signal is frequency modulated. The stereo-multiplex signal consists of a stereo-sum signal and a stereo-difference signal. The stereo-difference signal is amplitude modulated with suppressed carrier. To allow a coherent amplitude demodulation of the stereo-difference signal at the receiver, a pilot carrier with half the AM-carrier frequency is added to the stereo-multiplex signal.

The stereo-sum signal and the stereo-difference signal are defined by $$m_s(t)=a_l(t)+a_r(t)$$

$$m_d(t)=a_l(t)+a_r(t)$$

wherein $a_l(t)$ is the signal of the left audio channel and $a_r(t)$ is the signal of the right audio channel.

The stereo-multiplex signal is defined by $$m_{stmux}(t)=m_s(t)+\sin(2\omega_{pil}t)\cdot m_d(t)+A_{pil}\sin(\omega_{pil}t)$$

wherein $\omega_{pil}$ is the carrier frequency and $A_{pil}$ is the amplitude of the carrier.

The RDS-signal is added to the stereo-multiplex signal by modulating the in phase or in quadrature component of the 3rd harmonic of the pilot carrier. Therefore, the multiplex signal is defined by:

$$m(t)=m_{stmux}(t)+\cos(3\omega_{pil}t)\cdot m_{rds}(t)$$

wherein $m_{rds}(t)$ is the RDS-signal.

FIG. 8 shows ths basic functionality of a stereo-demultiplexer according to the prior art. Since the 2nd harmonic of the pilot carrier is required for the coherent amplitude demodulation of the stereo-difference signal, the stereo-demultiplexer needs to recover this 2nd harmonic of the pilot carrier to perform the stereo-demultiplexing. Therefore, a PLL-circuit 1 receives the multiplex signal m(t) locks to the pilot carrier and generates the 2nd harmonic of the pilot carrier, i.e. a signal $2\sin(2\omega_{pil}t)$. For the coherent amplitude demodulation of the stereo-difference signal a low phase error between pilot carrier and the 2nd harmonic of the pilot carrier is required. This coherent amplitude demodulation is performed by way of a first mixer 2 which receives the multiplex signal m(t) at its first input and the 2nd harmonic of the pilot carrier at its second input. The output signal of the demodulator 2 is input to a filter 3 which outputs the stereo-difference signal $m_d(t)$. The stereo-sum signal $m_s(t)$ is generated by a lowpass filtering of the multiplex signal m(t) with a lowpass filter 4.

The left and right audio signals l(t) and r(t) are calculated by addition and subtraction of the stereo-sum signal and the stereo-difference signal:

$$r(t)=m_s(t)-m_d(t)=(a_l(t)+a_r(t))-(a_l(t)-a_r(t))=2a_r(t)$$

$$l(t)=m_s(t)+m_d(t)=(a_l(t)+a_r(t))+(a_l(t)-a_r(t))=2a_l(t)$$

The left audio signal l(t) is generated by an adder 35 which receives the stereo-difference signal $m_d(t)$ at its first input and the stereo-sum signal $m_s(t)$ at its second input. The right audio signal r(t) is generated by a subtractor 36 which receives the stereo-sum signal $m_s(t)$ as minuend at its first input and the stereo-difference signal $m_d(t)$ as subtrahend at its second input.

The RDS-signal is coherent amplitude demodulated by multiplying the multiplex signal m(t) with the 3rd harmonic of the pilot carrier, i.e. a 57 kHz carrier in systems which use the frequency 19 kHz as carrier frequency. Therefore, the 3rd harmonic of the pilot carrier is extracted from the multiplex signal m(t) by filtering said signal with a bandpass filter 33 which has a center frequency of 57 kHz. The output signal of the bandpass filter 33 is input to a COSTAS-loop circuit 34 which locks to the amplitude modulated RDS signal to recover the RDS-carrier, i.e. the 3rd harmonic of the pilot carrier. The recovered RDS-carrier is multiplied with the output signal of the bandpass filter 33 by a second mixer 9 to demodulate the RDS-signal. With this multiplication and a following lowpass filtering by a lowpass filter 10 the coherent amplitude demodulation of the RDS-signal is performed. The output signal of the lowpass filter 10 is fed to a RDS-decoder 11 which decodes the RDS-signal $m_{rds}(t)$ and outputs the RDS-data.

For the detection of a stereo transmitter the stereo-demultiplexer needs to detect the pilot carrier. A reliable method for the detection of the pilot carrier is to perform a coherent amplitude demodulation of the multiplex signal m(t) with the pilot carrier. Therefore, the PLL-circuit 1 generates a carrier with a carrier frequency $\omega_{pil}$ that is in phase to the pilot carrier. This carrier is mixed with the multiplex signal by a third mixer 12 and the output signal of the third mixer 12 $m_g(t)$ is lowpass filtered by a lowpass filter 13 to suppress mixing products with a higher frequency. The so generated DC-signal $m_h(t)$ is a reliable information for the detection of stereo transmission.

This described stereo-demultiplexer has the particular disadvantage that it needs a quite high calculation power in a digital solution, especially since a carrier with the frequency of the 3rd harmonic of the pilot carrier, i.e. 57 kHz, has to be generated.

Therefore, it is the object of the present invention to provide a method for stereo-demultiplexing and RDS-demodulation needing less calculation power and a stereo-demultiplexer including a RDS-demodulator working according to said method, i.e. needing less calculation power.

The inventive method is defined in independent claim 1 and the stereo-demultiplexer according to the present invention is defined in independent claim 13. Preferred embodiments of the inventive method are defined in dependent claims 2 to 12.

The present invention and its embodiments will be better understood from the following detailed description of exemplary embodiments thereof taken in conjunction with the accompaning drawings, wherein FIG. 1 shows a stereo-demultiplexer according to a first preferred embodiment of the present invention;

FIG. 8 shows a stereo-demultiplexer according to the prior art.

According to a first aspect of the present invention the coherent amplitude demodulation of the RDS-signal is performed without the generation of an additional carrier with the frequency of the 3rd harmonic of the pilot carrier, i.e. without an additional 57 kHz carrier. Therefore, the present inventions achieves big advantages in terms of calculation power saving.

Figure 1:
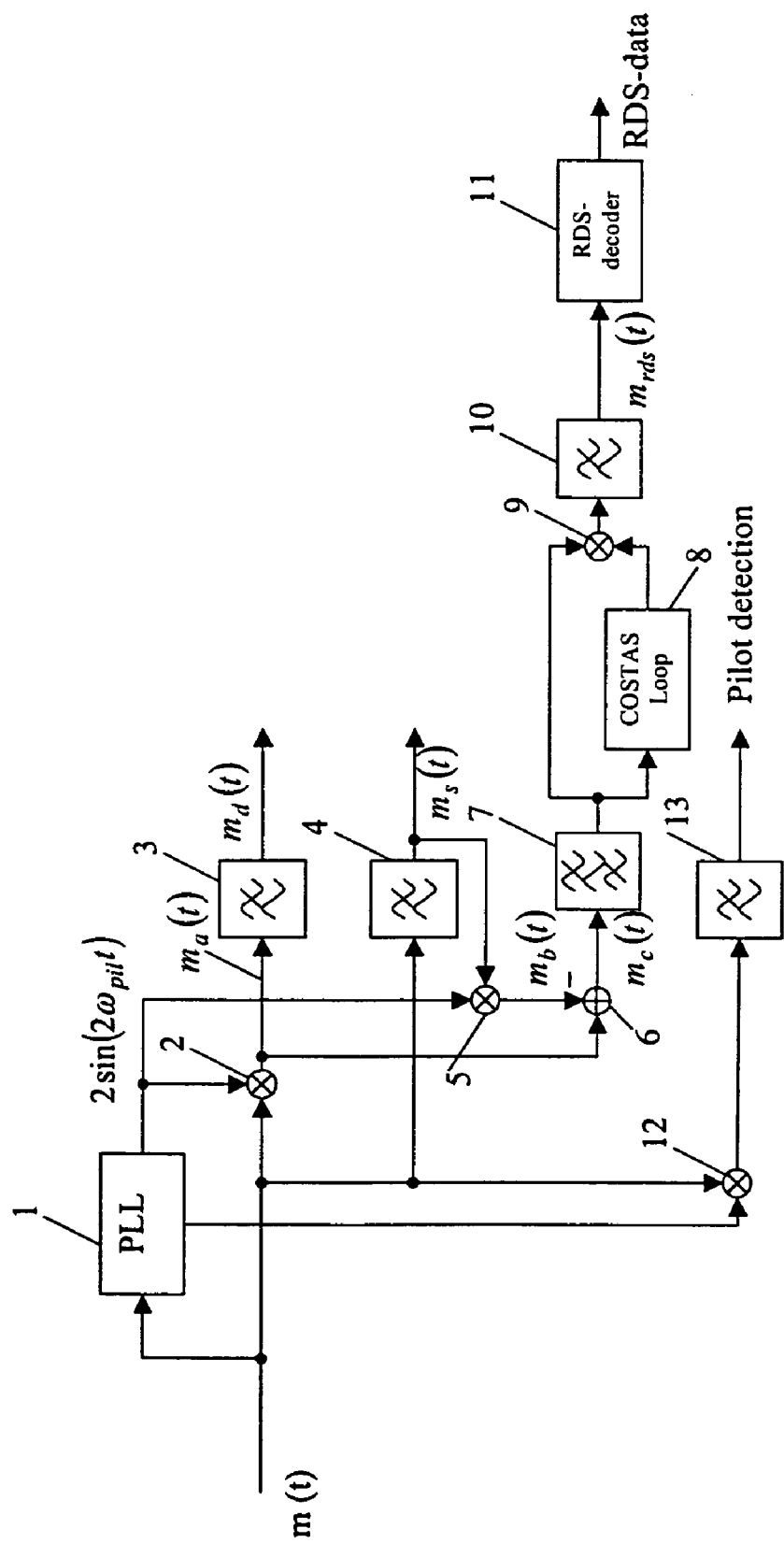

In the following the first aspect of the present invention will be explained on the basis of FIGS. 1 to 4 which show a first preferred embodiment according to the present invention. For the sake of simplicity the shown multiplex signal m(t) contains only the signals relevant for the present invention, i.e. the amplitude modulated RDS-signal and the pilot carrier. The demultiplexing and demodulation of the left and right audio signals is exactly performed like in the stereo-demultiplexer according to the prior art shown in FIG. 8. Also, the detection of a stereo transmitter is performed in a similar way. Therefore, the description of these parts of the stereo-demultiplexer according to the present invention which is shown in FIG. 1 is omitted.

Figure 2:
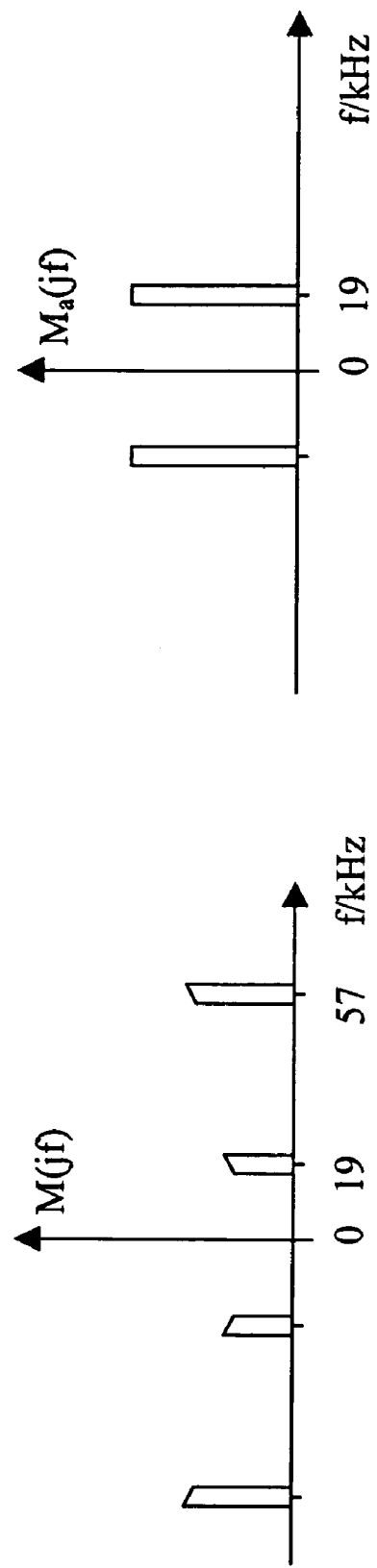
FIG. 2 shows the spectrum of the input signal and the output signal of the first mixer 2 shown in FIG. 1.

During the generation of the stereo-difference signal $m_d(t)$ an intermediate signal $m_a(t)$ is generated as output signal of the first mixer 2 which is input into the lowpass filter 3, i.e. the intermediate signal equals to the multiplex signal m(t) multiplied with the 2nd harmonic of the pilot carrier (multiplied with the 38 kHz carrier). Therefore, in the intermediate signal the RDS-carrier is mixed from the 3rd harmonic of the pilot carrier to the frequency of the pilot carrier, i.e. from 57 kHz to 19 kHz. The pilot carrier itself is mixed from 19 kHz to −19 kHz, i.e. it is mirrored. FIG. 2 shows the spectrum M(jf) of the multiplex signal m (t) on its left hand side and the spectrum of the output of the first mixer 2, i.e. the spectrum $M_a(jf)$ of the intermediate signal $m_a(t)$ on its right hand side. As mentioned above, only the signals relevant for the present invention are shown. It can be seen that the spectrum $M_a(jf)$ of the intermediate signal $m_a(t)$ at 19 kHz consists of a mirrored pilot carrier and the frequency shifted amplitude modulated RDS-signal.

To properly extract the amplitude modulated RDS-signal from the intermediate signal $m_a(t)$, according to the first preferred embodiment of the present invention, the mirrored pilot carrier needs to be subtracted from the intermediate signal $m_a(t)$. To mirror the pilot carrier the stereo-sum signal $m_s(t)$ is multiplied with the 2nd harmonic of the pilot carrier, i.e. with the 38 kHz carrier by a fourth mixer 5.

Figure 3:
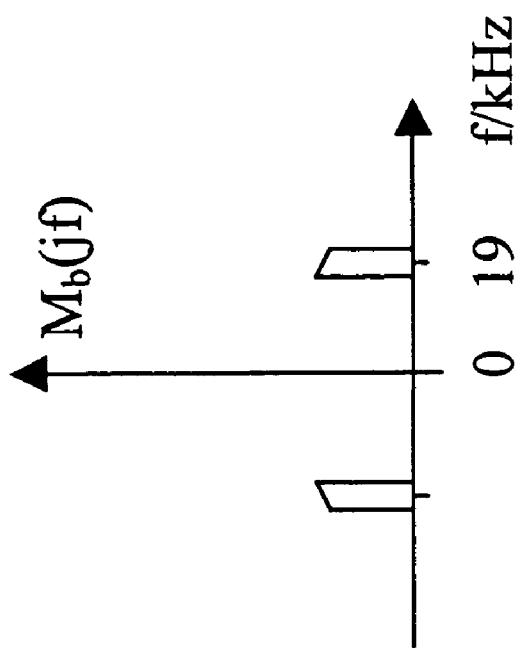
FIG. 3 shows the spectrum of the input signal and the output signal of the second mixer 5 shown in FIG. 1.
Figure 3:
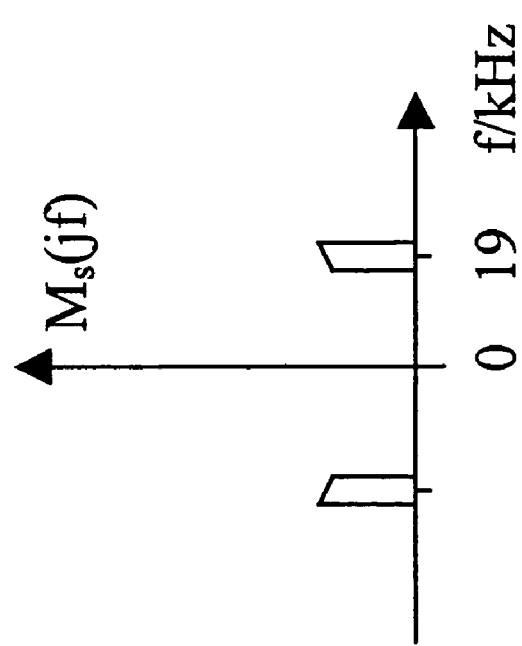

FIG. 3 shows the spectrum $M_s(jf)$ of the stereo-sum signal $m_s(t)$ at the left hand side and the spectrum $M_b(jf)$ of the mirrored pilot carrier at its right hand side.

Figure 4:
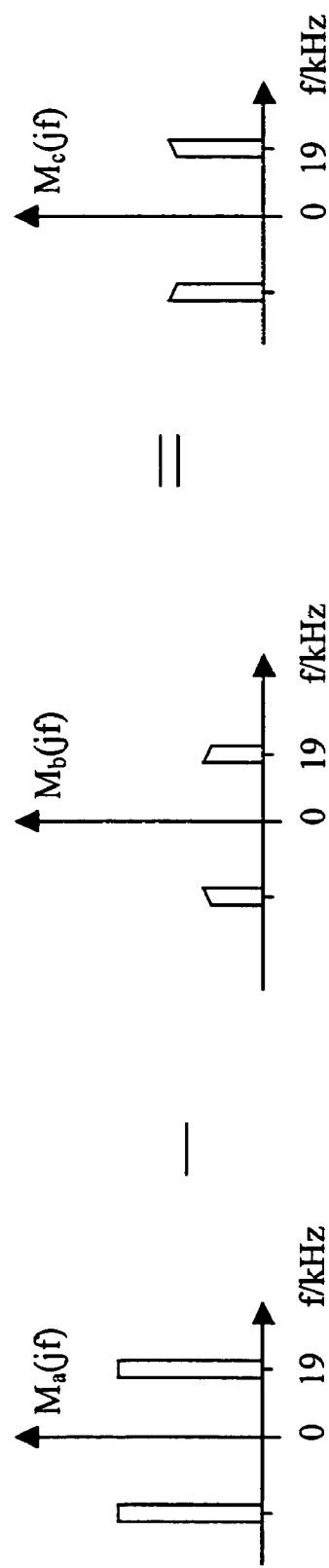
FIG. 4 shows the spectrum of the input signals and the output signal of the subtractor 6 shown in FIG. 1.

FIG. 4 shows the the subtraction of the mirrored pilot carrier $m_b(t)$ from the intermediate signal $m_a(t)$ which is performed by way of a substractor 6. The left hand side of FIG. 4 shows the spectrum $M_a(jf)$ of the intermediate signal $m_a(t)$ from which the spectrum $M_b(jf)$ of the mirrored pilot carrier $m_b(t)$, which is shown in the middle of FIG. 4, is subtracted to gain the spectrum $M_c(jf)$ of the amplitude modulated RDS-signal which is shown at the right hand side of FIG. 4.

FIG. 1 shows that the so generated amplitude modulated RDS-signal that has now a carrier frequency of 19 kHz (a carrier frequency according to the pilot carrier) is processed like in the prior art RDS-demodulator shown in FIG. 8. The only difference is that the center frequency of the bandpass filter 33 shown in FIG. 8 is changed to the frequency of the pilot carrier, i.e. 19 kHz in the bandpass filter 7 shown in FIG. 1 which receives the output signal of the subjector 6 and that the carrier frequency of the COSTAS-loop circuit 34 shown in FIG. 8 is changed from the 3rd harmonic of the carrier frequency to the carrier frequency, i.e. from 57 kHz to 19 kHz, in the COSTAS-loop circuit 8 shown in FIG. 1 which receives the output signal of the bandpass filter 7 and feeds its carrier having the frequency of the pilot carrier to the second mixer 9 that demodulates said output signal of the bandpass filter 7 by multiplying with the output signal of the COSTAS-loop circuit 8.

Figure 5:
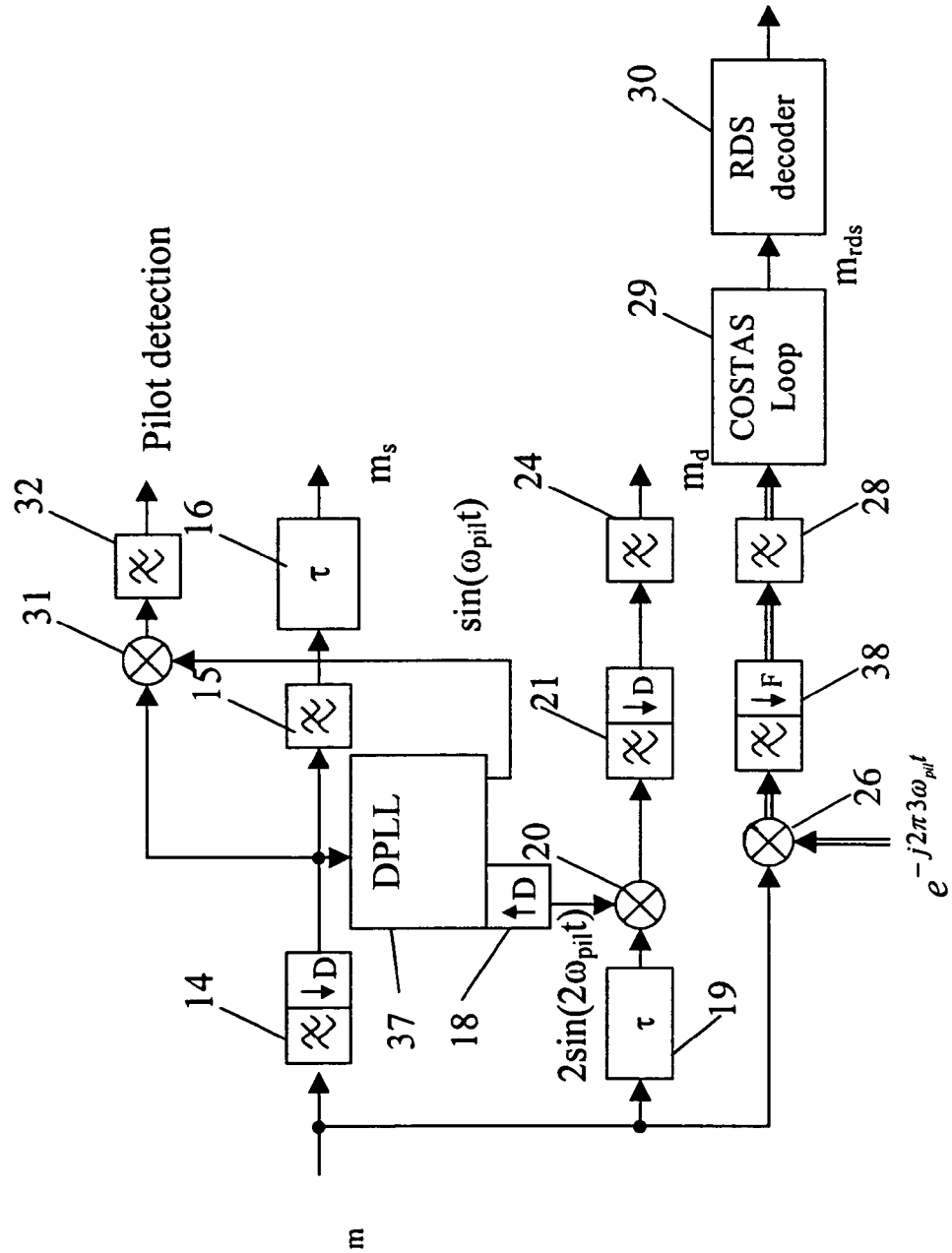
FIG. 5 shows a possible digital realization of a stereo-demultiplexer according to the prior art.

FIG. 5 shows a possible digital solution of the prior art stero-demultiplexer and RDS decoder shown in FIG. 8 which elucidates a sampling rate decimation. Such a sampling rate decimation can be performed, because the frequency modulated multiplex signal m(t) has a much higher bandwidth than the frequency demodulated and stereo-demultiplexed audio signal and the RDS signal. The combination of the present invention with the digital stereo-demultiplexer shown in FIG. 5 has the advantage of a very low calculation power. For a better understanding, first this digital stereo-demultiplexer is described without the application of the present invention.

As it is shown in FIG. 5, the stereo-sum signal $m_s(t)$ is generated from the multiplex signal m(t) by a sampling rate decimation with a decimation factor D by a first sampling rate decimation filter 14 and a following lowpass filtering with a lowpass filter 15. The so generated stereo-sum signal $m_s(t)$ is thereafter delayed by a first delay element with a delay of τ to equalize the group delay of a second sampling rate decimation filter 21 in the difference path.

Furtheron, a digital PLL circuit 37 (which replaces the PLL circuit 1 of the first preferred embodiment according to the present invention) is working with the decimated sampling rate. Therefore, the decimation filtering of the sum path, i.e. the path to generate the stereo-sum signal $m_s(t)$ is used for the sampling rate decimation of the stereo-sum signal $m_s(t)$ and the pilot carrier, i.e. the output signal of the first sampling rate decimation filter 14 is not only input to the lowpass filter 15 but also to the DPLL-cicrcuit 37. This realization is described in more detail in a parallel european patent application "digital stereo demultiplexer" of the same applicant.

The DPLL-circuit 37 generates a carrier for the coherent amplitude demodulation of the stereo-difference signal $m_d(t)$ and a carrier for the coherent pilot carrier detection. i.e. the detection of a stereo transmitter. Within the DPLL-circuit 37 another carrier is required for synchronization purposes that is in quadrature to the pilot carrier. Therefore, the DPLL-circuit 37 generates three carriers, i.e. the 38 kHz carrier for the coherent amplitude demodulation of the stereo-difference signal $m_d(t)$ and a complex 19 kHz carrier. The complex 19 kHz carrier consists of the carrier for the coherent pilot carrier detection and the in quadrature component of this 19 kHz carrier which is required within the DPLL-cicuit 37 for synchronization purposes.

Similar to the detection of a stereo transmitter described in connection with FIG. 8 the stereo transmitter is detected by a multiplication of the multiplex signal m(t) with the pilot carrier and a following lowpass filtering. This demodulation is performed by a third mixer 31 which receives the sampling rate decimated multiplex signal from the first sampling rate decimation filter 14 and the pilot carrier generated by the DPLL-circuit 37 on basis of said sampling rate decimated multiplex signal. The output signal of the third mixer 31 is input to a lowpass filter 32 which outputs the pilot detection signal $m_h(t)$.

The coherent amplitude demodulation of the stereo-difference signal $m_d(t)$ needs to be performed at a sampling rate which is higher than the sampling rate of the audio signal, since the bandwidth of the multiplex signal m(t) is higher than the banwidth of the audio signal. Therefore, the carrier for the coherent amplitude demodulation of the stereo-difference signal $m_d(t)$ needs to be generated with a higher sampling rate. FIG. 5 shows that the carrier is generated with a sampling rate that is D times higher than the sampling rate of the audio signal, since the second harmonic of the pilot carrier generated by the DPLL-circuit 37 is upsampled with a factor of D in a sampling rate upsampling circuit 18. To perform the coherent amplitude demodulation which is necessary to generate the stereo-difference signal $m_d(t)$ the so generated carrier with a carrier frequency of $2\omega_{pil}$ that is locked in phase to the pilot carrier is multiplied with the multiplex signal m(t) by a first mixer 20. Furtheron, the output signal of the first mixer 20 is lowpass filtered by a lowpass filter 24 which outputs the stereo-difference signal $m_d(t)$. A second sampling rate decimation filter 21 decimates the sampling rate of the output signal of the first mixer 20 by a decimation factor of D by before it is input to the lowpass filter 24. Furtheron, the multiplex signal m(t) needs to be delayed by a delay of τ to equalize the group delay of the first sampling rate decimation filter 14 in the sum path before it is input to the first mixer 20. This delay is achieved by a second delay element 19 arranged before the first mixer 20.

Within the digital stereo-demultiplexer shown in FIG. 5 the RDS data is generated by mixing the multiplex signal m(t) with a complex third harmonic of the pilot carrier to the baseband with a fifth mixer 26 before the complex RDS baseband signal is sampling rate decimated by a factor F with a third sampling rate decimation filter 38, a subsequent filtering with a reconstruction lowpass filter 28 which is a matched filter for the optimal RDS decoding and a generation of the amplitude demodulated RDS-signal with the help of a COSTAS-loop circuit 29 which locks to the RDS carrier, whereafter the so generated coherent amplitude demodulated RDS-signal is fed to an RDS-decoder 30 which outputs the RDS data.

Figure 6:
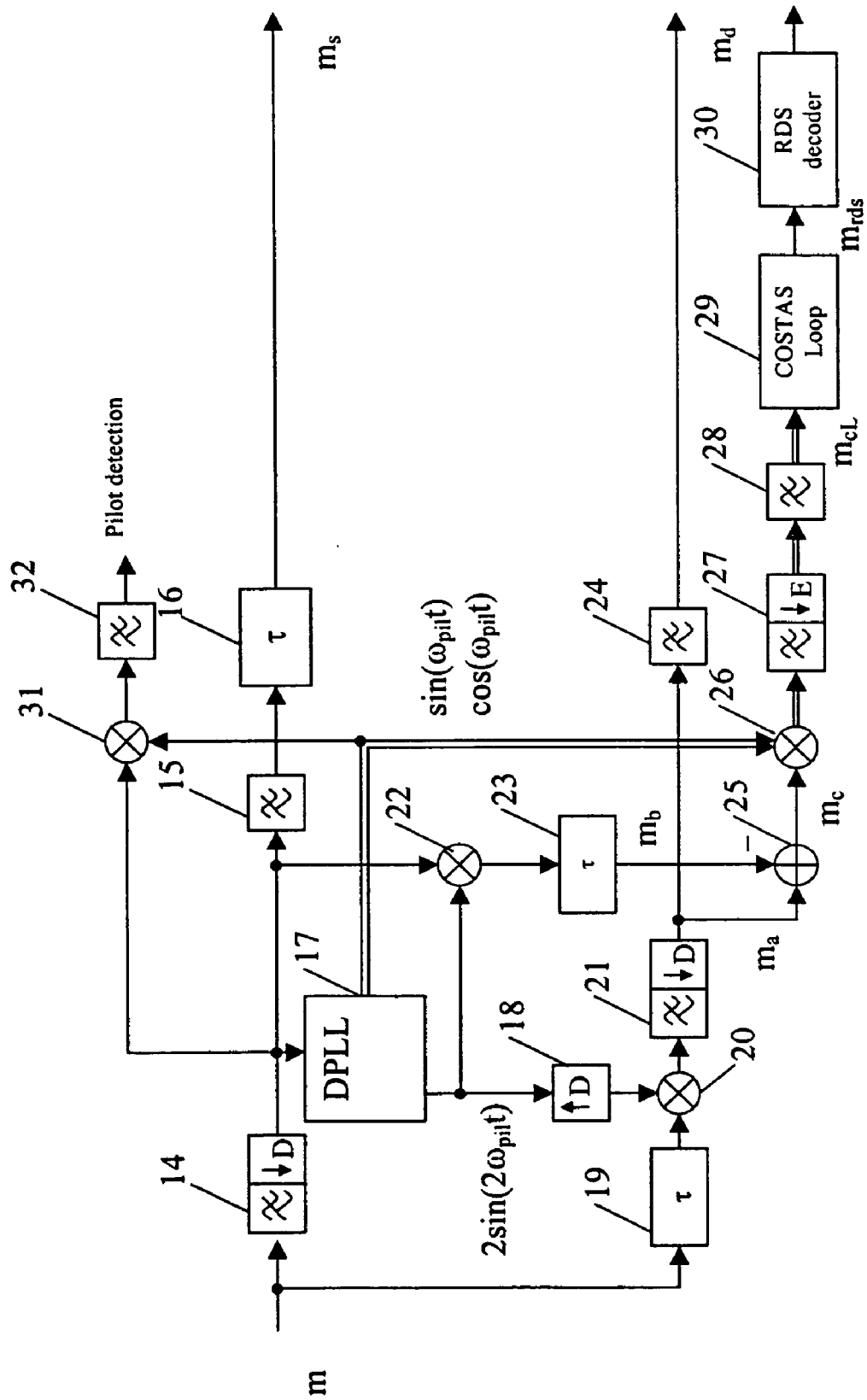
FIG. 6 shows a stereo-demultiplexer according to a second preferred embodiment of the present invention.

FIG. 6 shows a second preferred embodiment according to the present invention. This second preferred embodiment makes use of the sampling rate decimation filter of the stereo-difference signal for the sampling rate decimation of the RDS signal.

Therefore, the stereo-demultiplexer according to the second preferred embodiment of the present invention shown in FIG. 6 equals to the digital stereo-demultiplexer shown in FIG. 5 in the generation of the stereo transmitter detection, the stereo-sum signal $m_s(t)$ and the stereo-difference signal $m_d(t)$.

According to the second preferred embodiment of the present invention the RDS-signal is retrieved similar to the first preferred embodiment according to the present invention shown in FIG. 1, but on basis of sampling rate decimated signals. Therefore, the sampling rate decimated intermediate signal $m_d(t)$ which is output by the second sampling rate decimation filter 21 is input as minuend to a subtractor 25 which subtracts the mirrored pilot carrier $m_b(t)$ which is also sampling rate decimated and outputs an amplitude modulated RDS-signal $m_c(t)$. The mirrored pilot carrier $m_b(t)$ is generated by a mixing of the sampling rate decimated multiplex signal m(t) which is output from the first sampling rate decimation filter 14. The bandwidth of the sampling rate decimation filter is determined so that the stereo-sum signal and the pilot carrier are in the passband of the filter. This operation is performed with a fourth mixer 22 which receives the output signal of the first sampling rate decimation filter 14 and the sampling rate decimated second harmonic of the pilot carrier which is generated by a DPLL-circuit 17 which also receives the output signal of the first sampling rate decimation filter 14. This sampling rate decimated second harmonic of the pilot carrier is also fed to the upsampling circuit 18 before it is used for the coherent amplitude demodulation of the stereo difference signal $m_d(t)$. The output signal of the second modulator 22, i.e. the mirrored pilot carrier, is delayed by a delay of τ in a third delay element 23 to equalize the group delay of the second sampling rate decimation filter 21 in the difference path before it is output as mirrored pilot carrier $m_b(t)$ and therewith as subtrahent to the subtractor 25. The amplitude modulated RDS-signal $m_c(t)$ is input to a fourth mixer 26 which downconverts the amplitude modulated RDS signal to a complex baseband signal by mixing with the complex 19 kHz carrier. As mentioned above in connection with FIG. 1, this complex carrier with the frequency of the pilot tone is already available in the DPLL-circuit 17, since the in phase component thereof is needed for the stereo transmitter detection and the in quadrature component thereof is needed for synchronization purposes within the DPLL-circuit 17.

Apart from a further sampling rate decimation by a decimation factor of E instead of a decimation factor F the following processing of the RDS-signal is similar to that of the second preferred embodiment of the present invention shown in FIG. 5. The decimation factors D, E and F have the following relation:

$$D+E=F$$

This digital solution of the second preferred embodiment acording to the present invention has the advantage that the amplitude modulated RDS-signal is mixed to the complex baseband in combination with a sampling rate decimation. Therefore, the respective processing within the COSTAS-loop, the selectivity filtering and the matched filtering for the optimal decoding of the amplitude modulated RDS-signal are performed at low sampling rates, as described in connection with FIG. 5. As shown in FIG. 6, this can advantageously be achieved by using the sampling rate decimation filters of the stereo-sum signal and the stereo-difference signal for the RDS-demodulation. Additionally, all carriers for the frequency shift of the amplitude modulated RDS-signal are available from the stereo-demultiplexer. Therefore, no addtional sin/cos calculations or tables are required at high sampling rates for the coherent demodulation of the amplitude modulated RDS-signal. Therefore, this embodiment has big advantages in terms of calculation power saving.

As mentioned above, the DPLL has only to generate three carriers, namely the 38 kHz carrier (second harmonic of the pilot carrier) for the coherent amplitude demodulation of the stereo-difference signal and a complex 19 kHz carrier (complex frequency of the pilot carrier). The 19 kHz carrier consists of the carrier for the coherent pilot carrier detection and the in quadrature component of this 19 kHz carrier that is required within the DPLL for synchronization purposes.

According to the second preferred embodiment of the present invention the noise in the band of the pilot carrier is subtracted from the output signal of the second sampling rate decimation filter 21. Therefore, as also shown in connection with the first preferred embodiment of the present invention, the pilot carrier that is included in the stereo-sum signal $m_s(t)$ is mixed with the 38 kHz carrier (second harmonic of the pilot carrier) and delayed to equalize the group delay τ of the sampling rate decimation filters. The so generated signal is subtracted from the output of the sampling rate decimation filter 21 in the stereo-difference path to delete the noise in the band of the pilot carrier.

This generated amplitude modulated RDS-signal with a carrier amplitude of 19 kHz is mixed to the complex baseband by mixing with the complex 19 kHz carrier that is already present within the stereo-demultiplexer. A complex RDS baseband signal $m_{cL}(t)$ is sampling rate decimated by a factor of E before it is fed to the reconstruction lowpass filter 28. This reconstruction lowpass filter 28 is the matched filter for the optimal RDS decoding. The COSTAS-loop circuit 29 locks to the RDS-carrier and generates the amplitude demodulated RDS-signal. The so coherent amplitude demodulated RDS-signal is fed to the RDS-decoder 30 which outputs the RDS data.

Figure 7:
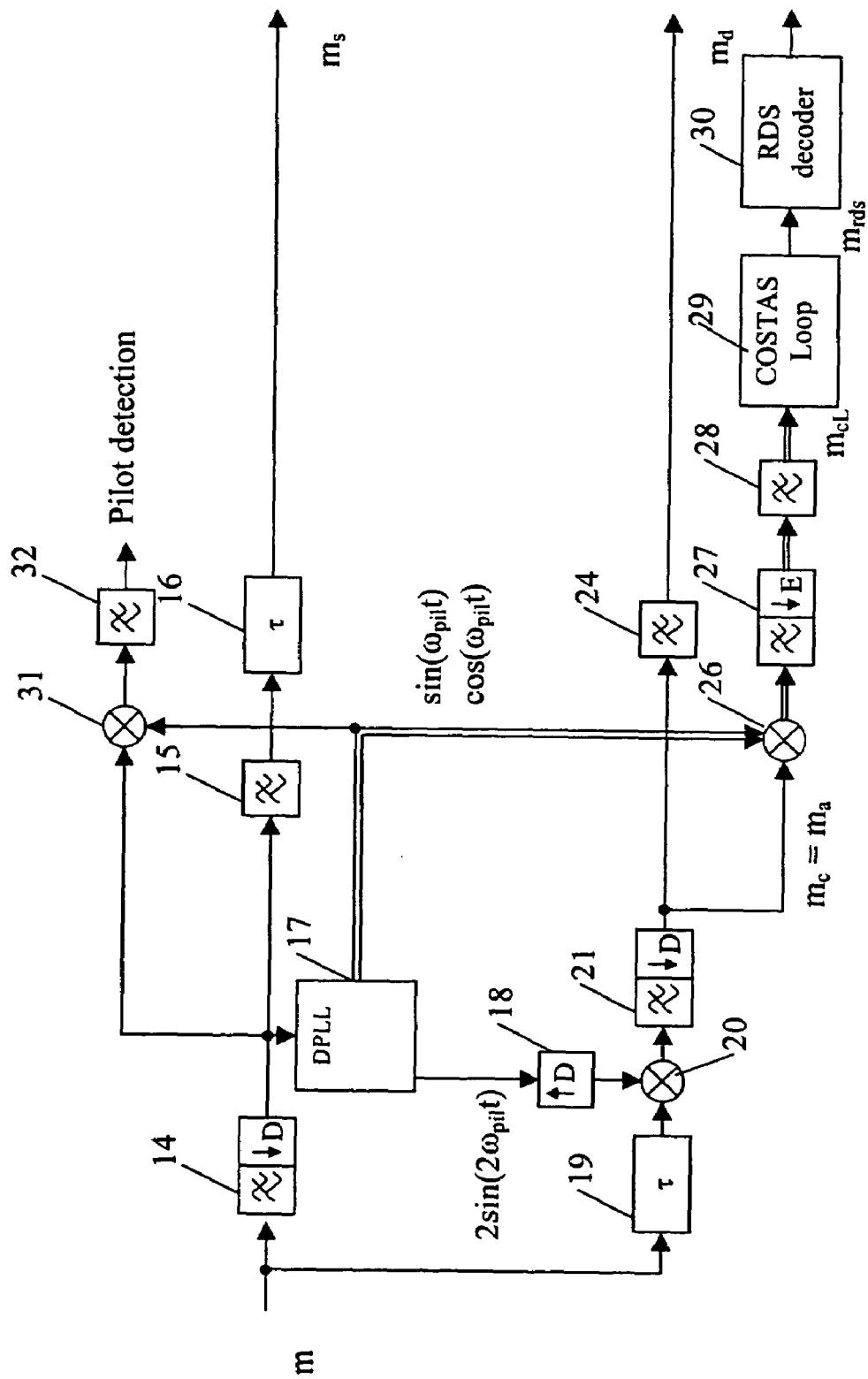
FIG. 7 shows a stereo-demultiplexer according to a fourth preferred embodiment of the present invention.

FIG. 7 shows the third preferred embodiment according to the present invention. This third preferred embodiment considers that the output signal of the second sampling rate decimation filter 21 can already be used for the RDS-decoding with only a slight performance degradation. The performance degradation results from the additional noise in the band of the pilot carrier that is added to the RDS-signal. Therefore, the third mixer 26 directly receives the output signal of the second sampling rate decimation filter 21, whereafter the RDS-signal undergoes the same processing as shown and described in conneciton with FIG. 6. Accordingly, the third preferred embodiment of the present invention shown in FIG. 7 does not comprise the fourth mixer 22, the third delay element 23 and the subtractor 25.

It is obvious that such changes and modifications can also be applied to the first preferred embodiment according to the present invention shown in FIG. 1, i.e. that the bandpass filter 7 directly receives the intermediate signal $m_a(t)$ and the stereo-demultiplexer shown in FIG. 1 would not comprise the third mixer 5 and the subtractor 6.

The invention claimed is:

1. Method to retrieve RDS information by filtering and transforming an incoming multiplex signal (m(t)) into an amplitude demodulated RDS signal ($m_{RDS}(t)$), wherein an amplitude modulated RDS signal ($m_c(t)$) is derived on basis of an intermediate signal ($m_a(t)$) obtained during an extraction of a stereo-difference signal ($m_d(t)$) from the incoming multiplex signal, and the intermediate signal ($m_a(t)$) is obtained by multiplying the multiplex signal (m(t)) with the second harmonic of a pilot carrier ($2\sin(2\omega_{pil}t)$), wherein
the amplitude modulated RDS signal ($m_c(t)$) is derived by subtracting a stereo-sum signal ($m_s(t)$) multiplied by the second harmonic of a pilot carrier ($2\sin(2\omega_{pil}t)$) from the intermediate signal ($m_a(t)$).

2. Method to retrieve RDS information by filtering and transforming an incoming multiplex signal (m(t)) into an amplitude demodulated RDS signal ($m_{RDS}(t)$), wherein an amplitude modulated RDS signal ($m_c(t)$) is derived on basis of an intermediate signal ($m_a(t)$) obtained during an extraction of a stereo-difference signal ($m_d(t)$) from the incoming multiplex signal, and the intermediate signal ($m_a(t)$) is obtained by multiplying the multiplex signal (m(t)) with the second harmonic of a pilot carrier ($2\sin(2\omega_{pil}t)$), wherein
the amplitude modulated RDS signal ($m_c(t)$) is set to be the intermediate signal ($m_a(t)$).

3. Method to retrieve RDS information by filtering and transforming an incoming multiplex signal into an amplitude demodulated RDS signal, wherein
an amplitude modulated RDS signal is derived on basis of a first intermediate signal obtained during an extraction of a stereo-difference signal from the incoming multiplex signal;

said first intermediate signal lies along a signal path separate from a signal path of an extraction of a stereo-sum signal from the incoming multiplex signal; and
said first intermediate signal is distinct from all intermediate signals obtained during said extraction of said stereo-sum signal from said incoming multiplex signal.

4. RDS demodulator, adapted to operate according to the method defined in claim 3.

5. A method for retrieving RDS information from a multiplex signal, comprising the steps of:
obtaining, from said multiplex signal, a first intermediate signal from which a stereo-difference signal of said multiplex signal can be extracted;
extracting, from said multiplex signal, a stereo-sum signal; and
deriving an amplitude modulated RDS signal on the basis of said first intermediate signal, wherein
said obtaining of said first intermediate signal is separate from said extracting of said stereo-sum signal; and
said first intermediate signal is distinct from said multiplex signal.

6. Method according to claim 5, wherein the intermediate signal is obtained by multiplying the multiplex signal with the second harmonic of a pilot carrier.

7. Method according to claim 5, wherein the amplitude modulated RDS signal is derived by subtracting a stereo-sum signal multiplied by the second harmonic of a pilot carrier from the intermediate signal.

8. Method according to claim 5, further comprising:
amplitude demodulating the amplitude modulated RDS signal; and
decoding the amplitude demodulated RDS signal.

9. Method according to claim 8, wherein the amplitude demodulation of the amplitude modulated RDS signal is performed by a coherent amplitude demodulation with a carrier which is recovered by a COSTAS-loop from the amplitude modulated RDS signal.

10. Method according to claim 8, wherein the amplitude demodulation of the amplitude modulated RDS signal into a RDS baseband signal is performed by a complex demodulation.

11. Method according to claim 10, wherein the complex carrier needed for the complex demodulation is output from a digital PLL-circuit for pilot carrier recovery.

12. Method according to claim 10, wherein the carrier of the RDS signal is recovered with a COSTAS-loop locking to the RDS baseband signal.

13. Method according to claim 5, wherein the intermediate signal is obtained on basis of a sampling rate decimated stereo-difference signal.

14. Method according to claim 5, further comprising a sampling rate decimation to obtain carriers for the respective demodulations.

15. Method according to claim 5, further comprising a sampling rate decimation of the RDS baseband signal.

16. The method of claim 5, wherein said multiplex signal fulfills the equation $$m_{simux}(t)=m_s(t)+A_{pil}(t)\cdot\sin(\omega_{pil}t)+m_d(t)\cdot\sin(2\omega_{pil}t)+m_{rds}(t)\cdot\cos(3\omega_{pil}t),$$

where $m_{simux}(t)$ is said stereo multiplex signal, $m_s(t)$ is said stereo-sum signal, $m_d(t)$ is said stereo-difference signal, $A_{pil}(t)$ is an amplitude of a pilot carrier, $m_{rds}(t)$ is an RDS signal, $m_{rds}(t)\cdot\cos(3\omega_{pil}t)$ is said amplitude modulated RDS signal and $\omega_{pil}$ is a frequency of said pilot carrier.

17. A method for retrieving RDS information from a multiplex signal, comprising the steps of:
coherently demodulating said multiplex signal employing a second harmonic of a pilot carrier of said multiplex signal so as to obtain a first intermediate signal; and
deriving an amplitude modulated RDS signal on the basis of said first intermediate signal, wherein
said coherent demodulation consists of multiplying said multiplex signal by said second harmonic of said pilot carrier, and
said first intermediate signal is a signal from which a stereo-difference signal of said multiplex signal can be extracted by one of a low-pass filtering or a combination of sampling rate decimation filtering and low-pass filtering.

18. A method for retrieving RDS information from a multiplex signal, comprising the steps of:
coherently demodulating said multiplex signal employing a second harmonic of a pilot carrier of said multiplex signal so as to obtain a first intermediate signal;
deriving an amplitude modulated RDS signal on the basis of said first intermediate signal;
sampling rate decimation filtering said multiplex signal to obtain a fourth intermediate signal;
multiplying said fourth intermediate signal by said second harmonic of said pilot carrier so as to mirror said fourth intermediate signal in the frequency domain;
sampling rate decimation filtering said first intermediate signal;
calculating a difference between said mirrored fourth intermediate signal and said sampling rate decimated first intermediate signal so as to obtain a difference signal;
mixing said difference signal with a complex signal consisting of said pilot carrier and a signal in a quadrature to said carrier so as to obtain a fifth intermediate signal.

19. A method for retrieving RDS information from a multiplex signal, comprising the steps of:
coherently demodulating said multiplex signal employing a second harmonic of a pilot carrier of said multiplex signal so as to obtain a first intermediate signal;
deriving an amplitude modulated RDS signal on the basis of said first intermediate signal;
sampling rate decimation filtering said multiplex signal to obtain a fourth intermediate signal;
multiplying said fourth intermediate signal by said second harmonic of said pilot carrier so as to mirror said fourth intermediate signal in the frequency domain;
sampling rate decimation filtering said first intermediate signal;
calculating a difference between said mirrored fourth intermediate signal and said sampling rate decimated first intermediate signal so as to obtain a difference signal;
mixing said difference signal with a complex signal consisting of said pilot carrier and a signal in a quadrature to said carrier so as to obtain a fifth intermediate signal;
sampling rate decimation filtering said fifth intermediate signal;
low-pass filtering said sampling rate decimated fifth intermediate signal; and
coherently demodulating said low-pass filtered fifth intermediate signal on the basis of a carrier signal of said low-pass filtered fifth intermediate signal.

20. A method for retrieving RDS information from a multiplex signal, comprising the steps of:
coherently demodulating said multiplex signal employing a second harmonic of a pilot carrier of said multiplex signal so as to obtain a first intermediate signal; and
deriving an amplitude modulated RDS signal on the basis of said first intermediate signal, wherein
said multiplex signal fulfills the equation $$m_{simux}(t)=m_s(t)+A_{pil}(t)\cdot\sin(\omega_{pil}t)+m_d(t)\cdot\sin(2\omega_{pil}t)+m_{rds}(t)\cdot\cos(3\omega_{pil}t)$$

were $m_{simux}(t)$ is said stereo multiplex signal, $m_s(t)$ is a stereo-sum signal, $m_d(t)$ is a stereo-difference signal, $A_{pil}(t)$ is an amplitude of a pilot carrier, $m_{rds}(t)$ is an RDS signal, $m_{rds}(t)\cos(3\omega_{pil}t)$ is said amplitude modulated RDS signal and $\omega_{pil}t$ is a frequency of said pilot carrier.

21. An apparatus for retrieving RDS information from a multiplex signal comprising:
means configured and adapted for obtaining, from said multiplex signal, a first intermediate signal from which a stereo-difference signal of said multiplex signal can be extracted;
means configured and adapted for extracting, from said multiplex signal, a stereo-sum signal; and
means configured and adapted for deriving an amplitude modulated RDS signal on the basis of said first intermediate signal, wherein
said means for obtaining said first intermediate signal is separate from said means for extracting said stereo-sum signal; and
said first intermediate signal is distinct from said multiplex signal.

22. The apparatus of claim 21, wherein said multiplex signal fulfills the equation $$m_{simux}(t)=m_s(t)+A_{pil}(t)\cdot\sin(\omega_{pil}t)+m_d(t)\cdot\sin(2\omega_{pil}t)+m_{rds}(t)\cos(3\omega_{pil}t)$$

where $m_{simux}(t)$ is said stereo multiplex signal, $m_s(t)$ is a stereo-sum signal, $m_d(t)$ is a stereo-difference signal, $A_{pil}(t)$ is an amplitude of a pilot carrier, $m_{rds}(t)$ is an RDS signal, $m_{rds}(t)\cdot\cos(3\omega_{pil}t)$ is said amplitude modulated RDS signal and $\omega_{pil}$ is a frequency of said pilot carrier.

23. An apparatus for retrieving RDS information from a multiplex signal comprising:
first means configured and adapted for coherently demodulating said multiplex signal employing a second harmonic of a pilot carrier of said multiplex signal so as to obtain a first intermediate signal; and
second means configured and adapted for deriving an amplitude modulated RDS signal on the basis of said first intermediate signal, wherein
said first means are multiplier means for multiplying said multiplex signal by said second harmonic of said pilot carrier, and
said first intermediate signal is a signal from which a stereo-difference signal of said multiplex signal can be extracted by one of a low-pass filtering or a combination of sampling rate decimation filtering and low-pass filtering.

24. An apparatus for retrieving RDS information from a multiplex signal comprising:
first means configured and adapted for coherently demodulating said multiplex signal employing a second harmonic of a pilot carrier of said multiplex signal so as to obtain a first intermediate signal;

second means configured and adapted for deriving an amplitude modulated RDS signal on the basis of said first intermediate signal;

means configured and adapted for sampling rate decimation filtering said multiplex signal to obtain a fourth intermediate signal;

means configured and adapted for multiplying said fourth intermediate signal by said second harmonic of said pilot carrier so as to mirror said fourth intermediate signal in the frequency domain;

means configured and adapted for sampling rate decimation filtering said first intermediate signal;

means configured and adapted for calculating difference between said mirrored fourth intermediate signal and said sampling rate decimated first intermediate signal so as to obtain a difference signal; and means configured and adapted for mixing said difference signal with a complex signal consisting of said pilot carrier and a signal in quadrature to said pilot carrier so as to obtain a fifth intermediate signal.

25. An apparatus for retrieving RDS information from a multiplex signal comprising:

first means configured and adapted for coherently demodulating said multiplex signal employing a second harmonic of a pilot carrier of said multiplex signal so as to obtain a first intermediate signal;

second means configured and adapted for deriving an amplitude modulated RDS signal on the basis of said first intermediate signal;

means configured and adapted for sampling rate decimation filtering said multiplex signal to obtain a fourth intermediate signal;

means configured and adapted for multiplying said fourth intermediate signal by said second harmonic of said pilot carrier so as to mirror said fourth intermediate signal in the frequency domain;

means configured and adapted for sampling rate decimation filtering said first intermediate signal;

means configured and adapted for calculating difference between said mirrored fourth intermediate signal and said sampling rate decimated first intermediate signal so as to obtain a difference signal;

means configured and adapted for mixing said difference signal with a complex signal consisting of said pilot carrier and a signal in quadrature to said pilot carrier so as to obtain a fifth intermediate signal;

means configured and adapted for sampling rate decimation filtering said fifth intermediate signal;

means configured and adapted for low-pass filtering said sampling rate decimated fifth intermediate signal; and means configured and adapted for coherently demodulating said low-pass filtered fifth intermediate signal on the basis of a carrier signal of said low-pass filtered fifth intermediate signal.

26. An apparatus for retrieving RDS information from a multiplex signal comprising:

first means configured and adapted for coherently demodulating said multiplex signal employing a second harmonic of a pilot carrier of said multiplex signal so as to obtain a first intermediate signal; and second means configured and adapted for deriving an amplitude modulated RDS signal on the basis of said first intermediate signal, wherein said multiplex signal fulfills the equation $$m_{simux}(t) = m_s(t) + A_{pil}(t) \cdot \sin(\omega_{pil}t) + M_d(t)\sin(2\omega_{pil}t) + m_{rds}(t) \cdot \cos(3\omega_{pil}t),$$

where $m_{simux}(t)$ is said stereo multiplex signal, $m_s(t)$ is a stereo-sum signal, $m_d(t)$ is a stereo-difference signal, $A_{pil}(t)$ is an amplitude of a pilot carrier, $m_{rds}(t)$ is an RDS signal, $m_{rds}(t)\cos(3\omega_{pil}t)$ is said amplitude modulated RDS signal and $\omega_{pil}$ is a frequency of said pilot carrier.

27. An apparatus for retrieving RDS information from a multiplex signal, comprising:

a first signal path, via which a stereo-difference signal is extracted from said multiplex signal;

a second signal path, separate from said first signal path, via which a stereo-sum signal is extracted from said multiplex signal; and a third signal path, branching from said first signal path, via which said RDS information is retrieved; and mixing means situated along said first signal path upstream from a branching off point of said third signal path from said first signal path.

* * * * *